United States Patent
Li et al.

(10) Patent No.: US 11,483,770 B2
(45) Date of Patent: Oct. 25, 2022

(54) POWER SAVING SIGNAL AND PROCEDURE DESIGN

(71) Applicant: Panasonic Intellectual Property Corporation of America, Torrance, CA (US)

(72) Inventors: Hongchao Li, Langen (DE); Hidetoshi Suzuki, Kanagawa (JP); Lilei Wang, Beijing (CN); Ankit Bhamri, Rödermark (DE); Quan Kuang, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 15 days.

(21) Appl. No.: 17/100,204

(22) Filed: Nov. 20, 2020

(65) Prior Publication Data
US 2021/0076327 A1  Mar. 11, 2021

Related U.S. Application Data

(63) Continuation of application No. PCT/CN2018/107657, filed on Sep. 26, 2018.

(51) Int. Cl.
  *H04W 52/02* (2009.01)
  *H04W 76/11* (2018.01)
  (Continued)

(52) U.S. Cl.
  CPC ....... *H04W 52/0229* (2013.01); *H04W 24/08* (2013.01); *H04W 52/0235* (2013.01); *H04W 76/11* (2018.02); *H04W 76/27* (2018.02)

(58) Field of Classification Search
  CPC ......... H04W 52/0229; H04W 52/0235; H04W 76/11; H04W 76/27; H04W 24/08
  (Continued)

(56) References Cited

U.S. PATENT DOCUMENTS

2012/0273564 A1  11/2012  Mercolino et al.
2012/0275364 A1*  11/2012  Anderson ......... H04W 52/0222
                                                                370/311
(Continued)

FOREIGN PATENT DOCUMENTS

CN  105165075 A  12/2015
CN  107690829 A  2/2018
(Continued)

OTHER PUBLICATIONS

Fatemeh et al., "5G NR PDCCH: Design and Performance", Jul. 9-11, 2018, IEEE, 6 pages (Year: 2018).*
(Continued)

*Primary Examiner* — Mong-Thuy T Tran
(74) *Attorney, Agent, or Firm* — Seed IP Law Group LLP

(57) ABSTRACT

The present disclosure relates to a terminal and a base station as well as to a method which may be performed at a terminal and at a base station in a communication system. For example, a mobile device may comprise a transceiver, which, in operation, receives and/or transmits a signal, as well as a circuitry. The circuitry monitors a signal in a first set of resources. When the monitored signal includes identification of the mobile device and an indicator having a first value, controls the transceiver: to receive or transmit signal on a second set of resources and to, after a time period indicated in the monitored control signal, not receive or transmit signal on a second set of resources and monitor the control signal in the first set of resources.

15 Claims, 5 Drawing Sheets

(51) Int. Cl.
*H04W 76/27* (2018.01)
*H04W 24/08* (2009.01)

(58) Field of Classification Search
USPC .......................................................... 370/318
See application file for complete search history.

(56) References Cited

U.S. PATENT DOCUMENTS

| | | | | |
|---|---|---|---|---|
| 2013/0044727 | A1* | 2/2013 | Nory | H04L 5/0053 370/330 |
| 2016/0128129 | A1 | 5/2016 | Kahtava et al. | |
| 2018/0255515 | A1 | 9/2018 | Gupta Hyde et al. | |
| 2019/0059056 | A1* | 2/2019 | Islam | H04W 52/0216 |
| 2019/0239189 | A1* | 8/2019 | Hwang | H04W 52/0216 |
| 2019/0268124 | A1 | 8/2019 | Luo et al. | |
| 2019/0297577 | A1* | 9/2019 | Lin | H04W 52/0216 |
| 2019/0297578 | A1 | 9/2019 | Song et al. | |
| 2020/0053644 | A1 | 2/2020 | Obermeier et al. | |
| 2020/0396687 | A1* | 12/2020 | Hwang | H04W 52/0229 |
| 2021/0259044 | A1* | 8/2021 | Islam | H04W 52/0235 |
| 2021/0297987 | A1* | 9/2021 | Hwang | H04W 52/0235 |
| 2021/0377854 | A1* | 12/2021 | Hwang | H04W 52/0216 |

FOREIGN PATENT DOCUMENTS

| | | | | |
|---|---|---|---|---|
| CN | 108377491 A | | 8/2018 | |
| EP | 3799485 A1 | * | 3/2021 | ........ H04W 52/0212 |
| RU | 2 663 219 C2 | | 8/2018 | |
| WO | 2018/085024 A1 | | 5/2018 | |
| WO | 2018/132100 A1 | | 7/2018 | |
| WO | WO-2019030079 A1 | * | 2/2019 | ............ H04W 52/02 |

OTHER PUBLICATIONS

English Translation of Russian Office Action, dated Oct. 29, 2021, for Russian Application No. 2020133465/07(061139), 8 pages.

Huawei, HiSilicon, "General considerations on UE power saving in Rel-16," R1-1809333, Agenda Item: 7.2.8, 3GPP TSG RAN WG1 Meeting #94, Gothenburg, Sweden, Aug. 20-24, 2018, 5 pages.

International Search Report, dated Jun. 28, 2019, for International Application No. PCT/CN2018/107657, 2 pages.

Extended European Search Report, dated Apr. 25, 2022, for European Application No. 18935613.2-1206, 8 pages.

Japanese Notice of Reasons for Rejection, dated Jun. 7, 2022, for Japanese Application No. 2020-567874, 9 pages, (with English translation).

Qualcomm Incorporated, "UE Power Evaluation for DRX with Wake-Up Signaling," R1-1700820, Agenda item: 5.1.3.1, 3GPP TSG-RAN WG1 NR AdHoc, Spokane, U.S.A., Jan. 16-20, 2017, 7 pages.

* cited by examiner

POWER SAVING SIGNAL AND PROCEDURE DESIGN

BACKGROUND

1. Technical Field

The present disclosure relates to transmission and reception of signals in a communication system. In particular, the present disclosure relates to methods and apparatuses for such transmission and reception.

2. Description of the Related Art

Currently, the 3rd Generation Partnership Project (3GPP) works at the next release (Release 15) of technical specifications for the next generation cellular technology, which is also called fifth generation (5G) also including "New Radio" (NR) radio access technology (RAT), which operates in frequency ranges up to 100 GHz. The NR is a follower of the current technology represented by Long Term Evolution (LTE) and LTE Advanced (LTE-A). The NR is planed to facilitate a single technical framework addressing all usage scenarios, requirements and deployment scenarios defined including, for instance, enhanced mobile broadband (eMBB), ultra-reliable low-latency communications (URLLC), massive machine type communication (mMTC) and the like. For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include scenarios with large number of devices with non-time critical data transfers such as smart wearables and sensor networks. The services eMBB and URLLC are similar in that they both demand a very broad bandwidth, however are different in that the URLLC service requires ultra-low latencies. Physical layer is based on time-frequency resources (such as Orthogonal Frequency Division Multiplexing, OFDM in LTE) and may support multiple antenna operation.

For systems like LTE and NR, further improvements and options may facilitate efficient operation of the communication system as well as particular devices pertaining to the system.

BRIEF SUMMARY

One non-limiting and exemplary embodiment facilitates providing an efficient scheduling, in particular in terms of power consumption at the terminal and in terms of service latency.

In one general aspect, the techniques disclosed here feature: a mobile device, comprising: a transceiver, which, in operation, receives and/or transmits a signal and a circuitry, which, in operation: (i) monitors a signal in a first set of resources, and (ii) when the monitored signal includes identification of the mobile device and an indicator having a first value, controls the transceiver: to receive or transmit signal on a second set of resources and to, after a time period indicated in the monitored control signal, not receive or transmit signal on a second set of resources and monitor the control signal in the first set of resources.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

DETAILED DESCRIPTION

Figure 1:
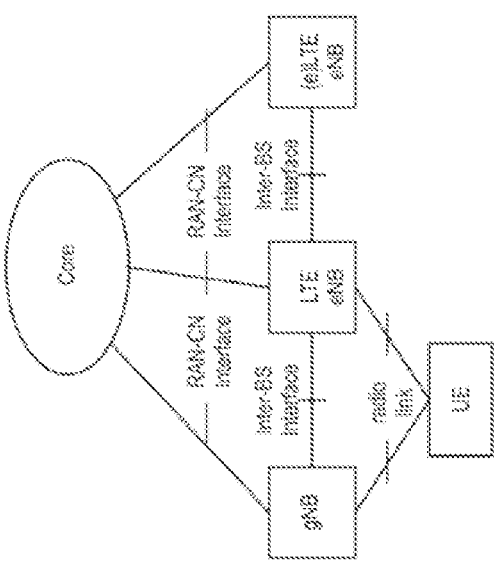
FIG. 1 shows an exemplary architecture for a 3GPP NR system including exemplary user and control plane architecture for the LTE eNB, gNB, and UE.

FIG. 1 shows an exemplary example of a communication system including a base station and a terminal and a core network. Such communication system may be a 3GPP network. Such communication system may be a 3GPP system such as NR and/or LTE and/or UMTS. For example, as illustrated in FIG. 1, the base station (BS) may be a gNB (e.g., an NR gNB) or an eNB (e.g., an LTE). However, the present disclosure is not limited to these 3GPP systems or to any other systems. Even though the embodiments and exemplary implementations are described using some terminology of 3GPP systems, the present disclosure is also applicable to any other communication systems, and in particular in any cellular, wireless and/or mobile systems.

A terminal is referred to in the LTE and NR as a user equipment (UE). This may be a mobile device such as a wireless phone, smartphone, or an USB stick with the functionality of a user equipment. However, the term mobile device is not limited thereto, in general, a relay may also have functionality of such mobile device, and a mobile device may also work as a relay.

Base station is a network node, e.g., forming a part of the network for providing services to terminals. Base station is a network node, which provides wireless access to terminals.

In LTE as well as in NR, Radio Resource Control (RRC) protocol is used between the base station (eNB, gNB) and the terminal (UE) for configuration. RRC is a control protocol, which resides over physical and MAC layer. RRC defines for UE various states according to the transmission/reception behavior. For example, the RRC_CONNECTED state means, among others, that the UE has an established radio access bearer and can transmit and/or receive data. On the other hand, RRC_IDLE mode means, among others, that a UE does not have a radio access bearer configured but may have signaling radio bearer established.

The present disclosure provides approaches, which may facilitate an efficient power saving for a mobile terminal and, in particular power saving in relation with communication between the mobile terminal and a base station.

In the LTE, efficiency of power utilization is increased by applying Discontinuous Reception (DRX). The DRX is a way to shorten the active period in RRC_CONNECTED mode without scheduling grant. In particular, by means of timers, which may be configured by an eNB, the UE is capable of operating in an active mode in which it monitors PDCCH and in a DRX mode, in which the reception is switched off.

However, the DRX mechanism provides ON durations (in which a PDCCH is monitored) and OFF mode (in which no PDCCH is monitored). The starting time and duration of the ON time (and thus also OFF time) is configured by the RRC, which means that it is not dynamic, but at most semi-static. Dynamic change means change with scheduling frequency, e.g., with the scheduling grants. Semi-static may still mean change during communication connection, e.g., by the RRC, but RRC configurations are less frequent than scheduling grants. Since in DRX, PDCCH cannot be monitored during the OFF durations, service latency may be increased, which may be less effective for some particular, delay-sensitive services. In other words, since in OFF mode, the UE does not monitor PDCCH, if traffic arrives, the UE cannot be scheduled until the next ON duration. Consequently, low latency requirements may not be guaranteed for some services. If the DRX ON duration periodicity is configured with a short value, the power consumption will increase due to the increased monitoring of the PDCCH. Even in case in which there is no traffic at all, the UE still needs to turn on to monitor PDCCH, which result in wasting of power. In summary, DRX does not provide a good trade-off between the power saving and the service latency. On the contrary, DRX may lead to long waiting time when traffic arrives and unnecessary power wasting when no traffic arrives.

Some exemplary embodiments of the present disclosure may facilitate providing a more dynamic, efficient, and/or UE-specific power adaption, possibly aligned with the traffic characteristics such as traffic arrival timing and pattern.

For instance, UE may monitor control information relating to a power saving (e.g., the PoSS) in a first mode in limited resources (indicated by a higher layer signaling), and UE turns into a second mode when UE detect the control information in a first mode, UE stay in the first mode when UE does not detect the control information in the first mode. The control information includes information relating to a length of the second mode, and UE turns from the second mode back to the first mode based on the length of the second mode.

Figure 2:
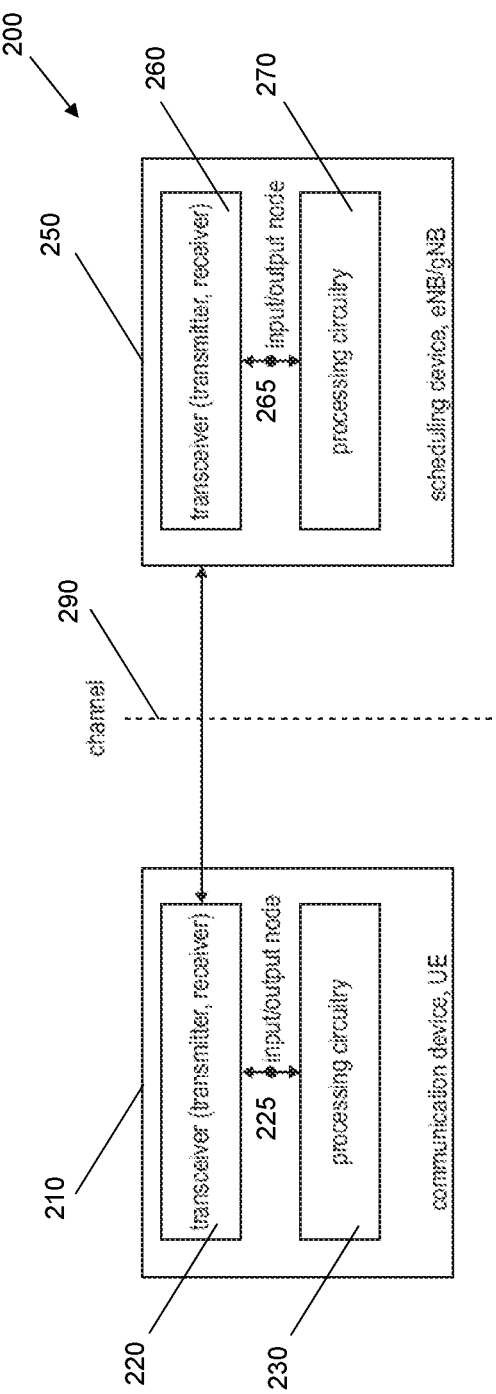
FIG. 2 is a block diagram illustrating an exemplary structure of a terminal and a base station.

An example of such mobile device 210 is shown in FIG. 2. FIG. 2 illustrates a general, simplified and exemplary block diagram of the user equipment 210 (also termed communication device) and a scheduling device 250 which is here exemplarily assumed to be located in the base station, e.g., the eLTE eNB (alternatively termed ng-eNB) or the gNB in 5G NR).However, in general, a scheduling device may also be a terminal in case of a side-link connection between two terminals. The UE and eNB/gNB are communicating with each other over a (wireless) physical channel 290 respectively using their transceivers 220 (UE side) and 260 (base station side). Together, the base station 250 and the terminal 210 form a communication system 200.

The communication device 210 may comprise the transceiver 220 and a (processing) circuitry 230. The transceiver 210 in turn may comprise and/or function as a receiver and/or a transmitter. The circuitry may be one or more pieces of hardware such as one or more processors or any LSIs. Between the transceiver and the processing circuitry there is an input/output point 225, 265 (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data that is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto.

According to an embodiment, a terminal corresponds to communication device 210 and comprises: a transceiver 220, which, in operation, receives and/or transmits a signal and a circuitry. The circuitry 230, in operation monitors a signal in a first set of resources and, when the monitored signal includes identification of the mobile device and an indicator having a first value, controls the transceiver: to receive or transmit signal on a second set of resources and to, after a time period indicated in the monitored control signal, not receive or transmit signal on a second set of resources and monitor the control signal in the first set of resources.

According to an embodiment, a network node corresponds to communication device 250 and comprises: a transceiver 260, which, in operation, receives and/or transmits a signal; and a circuitry 270, which, in operation: transmits a signal in a first set of resources, and when the monitored signal includes identification of a mobile device and an indicator having a first value, controls the transceiver: to receive or transmit signal on a second set of resources and to, after a time period indicated in the transmitted control signal, not receive or transmit signal on a second set of resources and transmit the control signal in the first set of resources.

Figure 3:
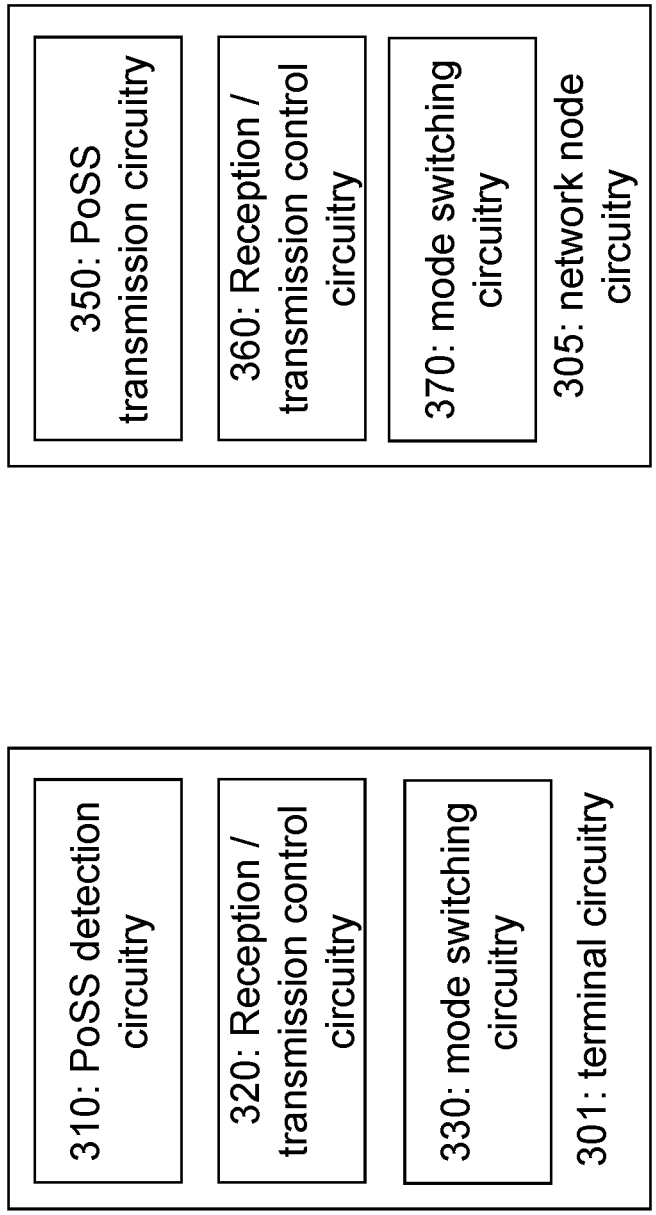
FIG. 3 is a block diagram illustrating structure of circuitries for transmission and reception of a power saving signal as well as behavior related thereto.

Moreover, FIG. 3 shows a more detailed structure of the mobile device and a network node such as a base station according to an exemplary implementation. A circuitry 301 may be used in a terminal. It includes a circuitry for PoSS detection 310, a circuitry 320 for controlling reception or transmission of a data channel, and a circuitry 330 for switching between the first mode and the second mode, i.e., between the PoSS detection performed by circuitry 310 and the data channel reception or transmission performed by the circuitry 320. A circuitry 305 may be used in a base station. It includes a circuitry for PoSS transmission 350 to a terminal, a circuitry 360 for controlling reception or transmission of a data channel for the terminal, and a circuitry 370 for switching between the first mode and the second mode for a terminal, i.e., between the PoSS transmission performed by circuitry 350 and the data channel reception or transmission performed by the circuitry 360.

The above mentioned time period(s) in which the terminal monitors the first set of resources may be referred to as power saving period(s) and the terminal's state during such period(s) may be referred to as power saving mode, for the purpose of an easier description. Moreover, the above-mentioned time period(s) indicated in the monitored control signal may be referred to as active period(s) and the terminal's state during such period(S) may be referred to as active mode.

In other words, according to some embodiments, a terminal can operate in two mutually exclusive modes, a power saving mode and an active mode. In the power saving mode, the terminal monitors power saving signal (PoSS) but does not monitor regular PDCCH. In the active mode, the terminal monitors regular PDCCH. The term "regular" in this context means the PDCCH such as the one in LTE and Release 15 NR.

Since monitoring of PDCCH consumes some power, by providing mode in which PoSS is monitored but not the PDCCH may facilitate some power saving in particular for cases in which monitoring of the second set of resources is more power-consuming than monitoring of the first set of resources. For example, the power consumption for monitoring PoSS may be smaller than the power consumption for monitoring PDCCH. This is the case, for instance, when the PoSS is provided less decoding candidates to be monitored and/or if PoSS uses a narrower bandwidth than the PDCCH. In other words, power savings may be achieved if there are less blind decodings.

The PoSS is located within the first set of resources which are monitored. The first set of resources may be given by one or more slot(s) and/or one or more symbol(s) in the time domain and by a one or more physical resource block(s) and/or one or more subcarrier(s) in the frequency domain. However, the present disclosure is not limited thereto and the first set of resources may further be defined, in addition or alternatively to the above examples, by a code (e.g., a scrambling or spreading sequence) and/or antenna port and/or one or more index of sequence ID or device ID. The first set of resources may be defined as a periodic pattern in the resources of the system (e.g., periodic in time and/or frequency domain). The period and the length of the signal may be specified (e.g., in time and/or frequency domain). The first set of resources may be predetermined, e.g., by a standard as fixed or depending on some transmission and/or traffic parameters. Alternatively, or in addition, the first set of resources may be configurable, e.g., via signaling such as RRC protocol.

In an example, a configuration of the limited resources in the power saving mode may be defined with some relative offset to some synchronization or reference signals. In particular, the first resource set is located in a fixed distance or a distance configured by radio resource control protocol from resources allocated for a synchronization signal or a reference signal. When looking at LTE or NR terminology, for instance, the first set of resources may be configured relatively to the location of the Synchronization Signal Block(s), SSBs, and/or Tracking Reference Signal(s), TRSs, and/or to Channel State Information Reference Signal(s), CSI-RS. SSB may be used for the purpose of synchronization with a particular base station, TRS for tracking the synchronization including also phase, and CSI-RS for the purpose of measuring channel quality by the terminal and providing the measured quality as a feedback on channel quality to the base station.

The distance to the synchronization signal and/or the reference signal may be variable in dependency of transmission and/or traffic parameters or configurable by signaling such as RRC signaling. Here, traffic parameters may include the type of traffic and parameters of traffic such as delay sensitivity, volume of the traffic, target quality in terms of an error rate, or the like. Transmission parameters may include parameters such as channel quality, modulation and coding applied, power, numerology, or the like. The relative position mentioned above does not necessarily mean that a PoSS is to be included with an offset to every SSB. The frequency of the PoSS may be equal or less or more than the frequency of the SSB (and/or TRS and/or CSI-RS or any kind of reference signal). The ratio between the frequency of PoSS and a synchronization signal and/or reference signal may be fixed or derivable based on parameters such as traffic or transmission parameters or the like and/or configurable by some signaling such as RRC signaling. It is noted that the above examples are not exhausting and that further configurations and parameters are possible.

The PoSS may be considered as signal, which, when received by the terminal, causes the terminal to switch from the power saving mode to the active mode. This may be performed in any way:

In a first example, the presence of the PoSS signal in the first set of resources causes the switching of the terminal from the power saving mode to the active mode. Absence of the PoSS signal in the first set of resources causes remaining in the power saving mode. This example provides a very simple, yet efficient switching mechanism. In case the PoSS signal is present, the first set of resources may further include resources for indicating the active period length and possibly further parameters.

In a second example, PoSS signal is always transmitted in the PoSS but may take different values. A first value may indicate causes the switching of the terminal from the power saving mode to the active mode. A second value, different from the first value may cause remaining of the terminal in the power saving mode.

As mentioned above, out of said active period, in the power saving period, if the monitored control signal includes the indicator having a second value, the processing circuitry may cause the receiver to continue monitoring the control signal in the first set of resources and not receive or transmit signal on a second set of resources.

The second set of resources includes for instance PDCCH resources. However, the second set of resources is not necessarily limited to the PDCCH resources, it may also include some reference signal resources and/or further signaling resources different from the PDCCH resources such as paging resources.

In an exemplary embodiment, in the power saving mode, the terminal monitors only the PoSS (apart from synchronization signals) but no signaling or data. Some reference signals may but does not have to be monitored either. Accordingly, paging channel is not monitored either. In this exemplary embodiment, a very efficient power saving may be facilitated.

According to an exemplary embodiment, in the active more, the terminal does not monitor the first set of resources. Since the first resources may also define, after obtaining the PoSS with value instructing switching to the active mode, the duration of the active period, monitoring PoSS in active mode is not necessary: the terminal returns to the power saving mode after the active period. This approach may facilitate saving some power and resources also in the active mode.

However, the present disclosure is not limited to this embodiment. The PoSS may also be monitored in the first set of resources when the terminal is in the active mode. Alternatively, the PoSS signal may be monitored in a third set of resources same or different from the second set of resources but different from the first set of resources. In any case, the present disclosure also provides an embodiment in which the first set of resources may include PoSS but not an indication of the active time period. In such case, PoSS signal in active mode is used to switch the terminal from the active mode to the power-saving mode. It is noted that a first value of PoSS may be used to switch from the power saving mode to the active mode while a second value of PoSS may be used to switch from the active mode to the power saving mode again. The first and the second values of the PoSS signal differ.

In other words, in an exemplary embodiment, the circuitry, in operation, when the mobile device is in the second (active) mode, monitors the control signal in the first set of resources and sets the mobile device into the first mode after a power-saving period when the monitored control signal includes the indicator (PoSS) having the second value.

Some of the benefits of providing the PoSS signal in the power saving mode are facilitated in that both shorter latency and power saving can be provided. When traffic arrives, the terminal can be scheduled timely. The power consumption may be lower since the monitoring of the PoSS may consume less power. If there is no traffic in long time period, just monitoring PoSS may consume less power than PDCCH blind decoding in a DRX ON duration.

In the context of the DRX applied in the RRC_CONNECTED mode, the above embodiments still monitor PoSS in the power saving mode, whereas in DRX OFF period, no signaling channel is monitored. In the above embodiments, the terminal can return into the active mode, from the power saving mode, dynamically or the terminal may remain in the power saving mode based on the PoSS with a short periodicity. In contrast, in the DRX, the terminal cannot turn into the ON period from the OFF period dynamically, but rather only in the configured timing. Consequently, the traffic adaption capability of the above embodiments and the DRX approach differs. In particular, in the above embodiments, the terminal does not have to go into the active mode if there is no traffic scheduled, which may facilitate power saving. In contrast, in the DRX approach, even if there is no traffic, the UE is required to go into the ON duration to monitor the (one or more) PDCCH(s) in the configured period, which may lead to power wasting.

It is noted that the first mode and the second mode both may be defined in the RRC_CONNECTED state of the terminal. However, this is not to limit the present disclosure, and—as will be shown below, embodiments are also envisaged in which the second mode corresponds to the RRC_CONNECTED mode. The present disclosure is even applicable to embodiments in which both the first and the second mode (power saving and active mode) are in RRC_IDLE mode.

In the following, two embodiments are described: in one of the embodiments, the control information obtained from the first set of resources when detecting the PoSS relates to resource candidates of a control information to monitor (such as PDCCH). In the other embodiment, the control information includes a second resource information relates to resource(s) or resource candidates of a data channel (such as PDSCH or PUSCH). A third embodiment, also described below, envisages to provide in the control information also one or more bits to indicate which of the first resource information related to a control channel or a second control information related to a data channel is included in the control information. The one or more bits may be generated with using an UE ID or RNTI.

PoSS Accompanied by PDCCH Occasions

In an exemplary and non-limiting embodiment, upon reception of the PoSS, the terminal transits into the active mode and, upon the transition, starts monitoring PDCCH to receive the scheduling grant.

In other words, the circuitry, in operation, upon setting the mobile device from the first mode to the second mode, determines resource candidates to be monitored (e.g., search space) on a physical downlink control channel (e.g., PDCCH) for receiving scheduling information (e.g., included in a DCI) based on an indication included in the monitored control signal and/or the identification of the mobile device. Then the circuitry controls the transceiver to receive (e.g., blindly decode) signal in the resource candidates and based on the received signal (e.g., DCI including an downlink or uplink grant) in the resource candidates, determines data resources for downlink or uplink data transmission. Finally, the circuitry controls the transceiver to receive (downlink direction) or transmit (uplink direction) data on the determined (e.g., granted) data resources.

Thus, in this embodiment, after transition into the active mode, the first resource on which data are to be received or transmitted by the terminal is determined at the terminal based on the PDCCH reception, just as any other resources in the active mode. In particular, after the transition from the power saving mode into the active mode, the upcoming resource candidates for data scheduling on PDCCH are determined based on an indication within the PoSS following information in the first set of resources such as CORESET information or blind decoding candidates. For example, in PoSS, a limited set of CORESET and/or blind decoding candidates can be indicated to assist terminal reception in the second set of resources. This may save the terminal power consumption when performing PDCCH blind detection. In general, the term CORESET denotes a control-resource set which is a set of resources used for control signaling in NR.

Alternatively or in addition, the candidates may be determined according to an identification of the terminal. The determination of the blind decoding candidates and/or CORESET and/or search space in the second set of resources, can be related to/calculated by the ID detected in the PoSS. In other words, the location of the resources may be determined by calculating the location depending on the ID.

The signaling information configuring the PDCCH may include indication of minimum and maximum aggregation level, whether the candidates are localized or distributed, transmission parameters for the candidates, etc.

Figures 4, 5:
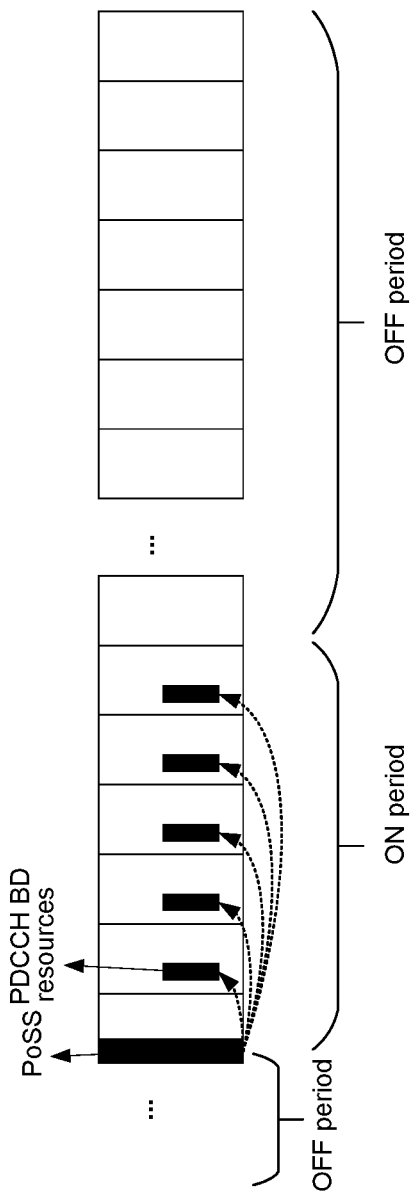
FIG. 4 is a schematic drawing illustrating an example of a power saving signal and its influence on scheduling a physical control channel.
FIG. 5 is a schematic drawing illustrating another example of a power saving signal and its influence on scheduling a physical control channel.

FIG. 4 illustrates schematically the timing of the power saving mode and active mode, as well as the PoSS and PDCCH resources. In particular, FIG. 4 shows an "OFF period" corresponding to the power saving period in which the first set of resources but not the second set of resources is monitored. At the PoSS occasion (first set of resource), the PoSS is actually detected and upon the detection, the terminal transits into an "ON period" corresponding to the active mode described above. The ON as well as OFF periods are divided into time slots, some of which in the active (ON) period including the PDCCH resources to be monitored by the terminal. In the OFF period, the terminal does not monitor PDCCH.

In FIG. 4, the arrows from the PoSS to the PDCCH blind decoding (candidate) resources illustrate that the PoSS may also provide an indication of the PDCCH resources. In this example, the PDCCH is monitored in five consecutive time slots, starting after an offset from the PoSS signal. Here, the offset is zero, i.e., the first PDCCH to be monitored is located in a slot immediately following the slot in which PoSS was located. However, the present disclosure is not limited to such an approach and the offset in terms of time slots and/or symbols may be non-zero.

FIG. 5 shows another exemplary implementation in which the PDCCH is not monitored in each slot after switching from the power saving mode into the active mode. Rather, the PDCCH is monitored with a frequency, which may be fixed (e.g., defined in the standard), or variable. The variability may be achieved by a dependency on other parameters such as numerology or the like of configurable by signaling from the base station to the terminal, for example by RRC signaling.

Since the power saving mode can be dynamically terminated by reception of the PoSS, the approach of the present disclosure is more flexible than the DRX. In DRX, when OFF period is over, the UE automatically turns into the active mode, no matter whether there is an actual traffic for the UE or not.

In LTE and in NR, hybrid automatic repeat request (HARQ) is employed to correct some transmission errors. A multi-process stop-and-wait HARQ is used which, in order to save resources, implicitly determines location of resources for transmission of the acknowledgements (positive or negative, ACK or NACK) based on the location of resources allocated (scheduled) for transmission of the data which are being acknowledged.

According to an exemplary implementation, in any of the above mentioned embodiments and examples, once the UE detects the PoSS, the UE transits into the active mode and determines not only the resource candidates for the data scheduling (PDCCH) based on an indication accompanying the PoSS or UE ID but also the resource for HARQ acknowledgements. In particular, the HARQ feedback resources are determined based on the scheduled PDSCH and PUSCH resources, for example based on the indication within the PDCCH and/or based on the UE ID. In other words, the indication (and/or the detected ID) in the PoSS can include parameters that is/are used to calculated the HARQ-ACK resource.

In other words, in one exemplary implementation, the circuitry, in operation, determines resources for receiving or transmitting of transmission acknowledgements corresponding to the determined data resources based on the indication included in the monitored control signal and/or the identification of the mobile device.

In summary, when UE detects the PoSS in the power saving mode, the UE may determine one or more of the following:

Upcoming PDCCH resources (based on the PoSS or an additional indication accompanying the PoSS in the first resources and/or UE identification), Resources for the HARQ feedback (based on the PoSS or an additional indication accompanying the PoSS in the first resources and/or UE identification), Timing information for returning back from the active mode into the power saving mode.

PoSS Accompanied by Data Channel Scheduling

In an exemplary and non-limiting embodiment, upon reception of the PoSS, the terminal transits into the active mode and determined the upcoming resource for data on PUSCH and/or PDSCH based on an indication in PoSS (or, more generally, based on an indication within the first set of resources) and/or based on a terminal identification.

In other words, the circuitry, in operation, upon setting the mobile device from the first mode to the second mode, determines data resources for downlink or uplink data transmission based on an indication included in the monitored control signal and/or the identification of the mobile device, and controls the transceiver to receive or transmit data on the determined data resources.

Figure 6:
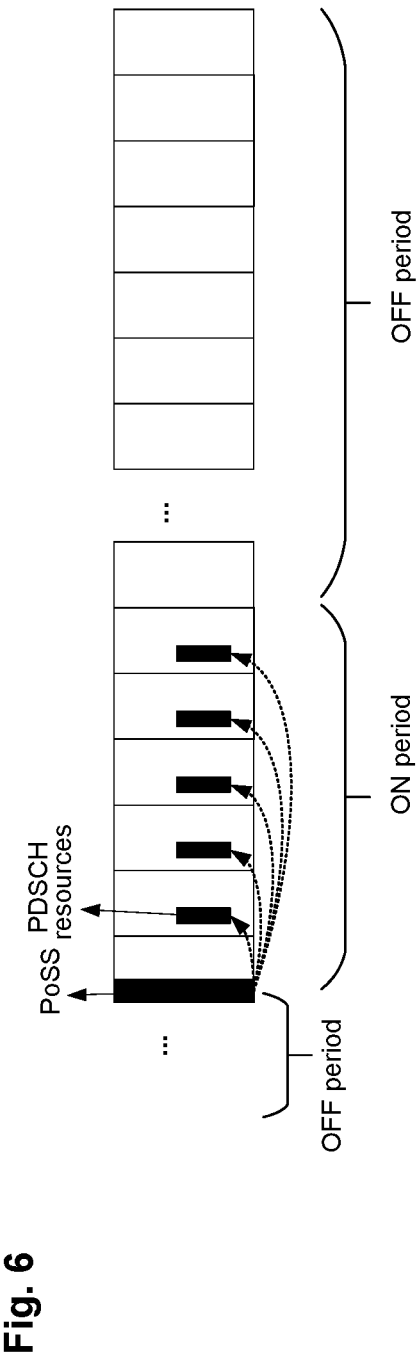
FIG. 6 is a schematic drawing illustrating an example of a power saving signal and its influence on scheduling a physical data channel.

FIG. 6 illustrates an example of such proceeding. In the power saving mode (OFF period), a PoSS signal is received in the first set of resources including also an indication of the PDSCH resources in which the terminal is to receive data. Thereby, the terminal transits into the ON period and receives the data in the indicated PDSCH resources as is indicated by the arrows staring in the PoSS signal and ending in the respective PDSCH resources in the time slots after the time slot with the PoSS signal. The first resources further indicate the timing for transition from the active mode (ON period) back to the power saving mode (OFF period). Accordingly, as shown in FIG. 6, after the ON period, at the specified timing or time period, the terminal transits to the power saving mode again.

It is noted that the PoSS carrying first resources may indicate with each PoSS the time period after which the terminal is to get back to the power saving mode. However, in some embodiments, such indication is not necessarily provided with each PoSS. In other words, the indication may carry timing, which is applicable to a plurality of the following transitions. For instance, the timing may be signaled only if it changes.

As already mentioned above, in some implementations, the time period or timing to switch to the power saving mode when in the active mode, does not need to be signaled within the first set of resources, or in the PoSS. Such time period or timing may be fixed or variable while being predefined by the standard. Alternatively, such timing may be set by the base station or another network node via control signaling such as RRC or the like.

Also in some implementations, the time period or timing to switch to the power saving mode when in the active mode, is signaled in the first set of resources by PoSS. Such time period or scheduling pattern or timing information may have more than one options, which is configured by RRC signaling. Among the options, PoSS indicates one of them to UE.

Figure 7:
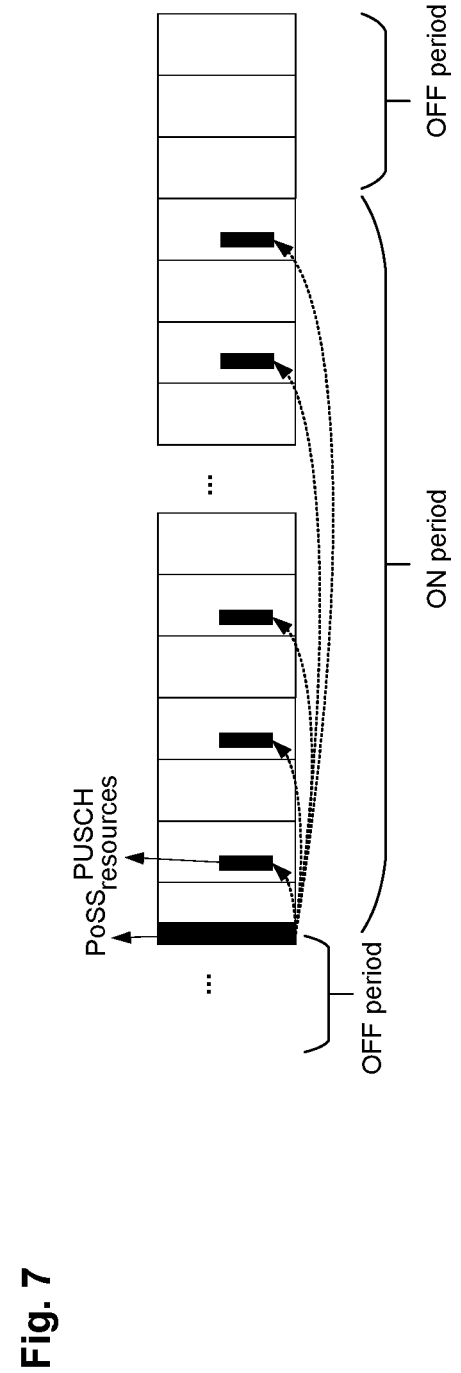
FIG. 7 is a schematic drawing illustrating another example of a power saving signal and its influence on scheduling a physical data channel.

In FIG. 6, the PDSCH resources are located in consecutive time slots. However, this is not to limit the present disclosure. As shown in FIG. 7, the PDSCH resources may be located periodically in certain time slots. In general, the PDSCH resources may be defined by a start and length in time and/or frequency domain or by a start, length and frequency in time and/or frequency domain. The start may be predefined—for instance set to be the next slot after the PoSS slot or an n-th slot after the PoSS slot (slot in which the PoSS signal was located). Alternatively, or in addition, the time domain resources may be defined on a symbol basis rather than (only) on time slot basis. Similarly, the resources may be defined in the frequency domain.

In the above examples of FIGS. 6 and 7, data transmission was performed over the PUSCH. However, the present disclosure is not limited thereto. The resource allocation is not necessarily for transmission on downlink. It may be an allocation of resources for uplink, for example for the PUSCH, or for both the PDSCH and the PUSCH.

Moreover, in an exemplary implementation, the circuitry, in operation, determines resources for receiving or transmitting of transmission acknowledgements corresponding to the determined data resources based on the indication included in the monitored control signal and/or the identification of the mobile device. In other words, the resources for HARQ feedback may be set according to the PDSCH and/or the PUSCH resources given by the PoSS resources. Moreover, these HARQ resources may be set in accordance with the PoSS either implicitly (since the PDSCH and PUSCH are determined based on the PoSS) or explicitly, by signaling the location and/or timing of the resources among the resources of the communication system. Moreover, the resource location may depend on the terminal identification.

The HARQ feedback resources for the uplink data transmission on PUSCH are downlink resources, whereas the HARQ feedback resources for the downlink data transmission on PDSCH are uplink resources.

In summary, according the above mentioned exemplary embodiments, following the detection of the PoSS the UE transits to the active mode and determines the upcoming resource for data PDSCH/PUSCH based on the indication within PoSS (or more generally within the first set of resources) and/or based on an identification of the terminal (any ID such as RNTI or a sequence associated with the UE). Moreover, the resource(s) for the feedback may be determined corresponding to the PDSCH and/or PUSCH based on the indication within PoSS and/or based on an identification of the terminal. The timing information of transiting from the active mode into the power saving mode (OFF period) again may also be defined in the first set of resources and, in particular by the PoSS signal.

It is noted that whenever HARQ acknowledgements or feedback are mentioned above, these are only non-limiting examples. The resources which may be determined based on the PoSS and/or UE ID may be resources for any kind of feedback including non-hybrid ARQ or even different kinds of feedback such as channel quality feedback based on measurements of channel conditions and/or traffic, or the like.

Some exemplary implementations of this embodiment may provide additional advantages. For example, for DRX, when OFF period is over, the UE automatically turns into the active mode, no matter whether or not there is a traffic to be scheduled to be transmitted or received by the terminal.
Selection Between PoSS Accompanied by PDCCH Indication or Data Channel Scheduling Following the PoSS accompanied by PDCCH occasions and PoSS accompanied by data channel scheduling described above, it is noted that they may be, but are not necessarily exclusive alternatives. In this exemplary embodiment, selection between these two approaches may be performed so that a terminal may be capable of performing both, controlled by a base station or, in general, by a network node.

In other words, in this embodiment, the circuitry, in operation, based on said indication and/or identification of the mobile device and/or based on traffic, selects whether upon setting the mobile device from the first mode to the second mode:

resource candidates to be monitored on a physical downlink control channel for receiving scheduling information to schedule data resources for downlink or uplink data transmission are determined according to an indication included in the monitored control signal and/or the identification of the mobile device, or directly the data resources for downlink or uplink data transmission are determined according to an indication included in the monitored control signal and/or the identification of the mobile device.

In particular, in one example, once the UE detects PoSS, it transits from the power saving mode to the active mode. The PoSS (or the resources, which also include the PoSS, the first set of resources) also indicates whether the UE is either:

i) to proceed to monitor future PDCCH (solution sketched above under "PoSS accompanied by PDCCH occasions") or ii) to directly receive PDSCH or transmit PUSCH (solution sketched above under "PoSS accompanied by data channel scheduling").

The indicated behavior i) or ii) may be valid within a certain timing window. The timing window may be dynamic, for example, also indicated in the first set of resources including PoSS. Alternatively, or in addition, the selection of the above behavior i) or ii) may be based on a detected UE ID, sequence ID, and/or an RNTI.

Alternatively, or in addition, there are other options for selection of the desired behavior i) or ii). The options of the UE behavior may be selected based on different traffic arrival patterns. For instance, the RRC may configure such options and the PoSS may select between such options. By way of an illustrative and non-limiting example, the RRC signaling may provide several configuration candidates of different parameters and also the above mentioned possible UE behaviors with respective indices. The PoSS can indicate which one of the behaviors the terminal should follow by signaling the corresponding index.

One of possible advantages of providing such options is facilitation of adaption to the traffic for different traffic characteristics. This can also accommodate the cases in which the arrival of data and scheduling are or are not predictable from the gNB side. If the data arrival/scheduling can be predicted, the PoSS can choose one of the configuration in RRC to match the future data arrival/scheduling pattern/profile, e.g., by choosing possibility of directly scheduling the data channel (PDSCH, PUSCH) with the PoSS. In some embodiments, PoSS can indicate one of the RRC configuration with parameter aligned with the traffic arrival and characteristic profile. If the data arrival/scheduling is not predictable, the PoSS can choose to just indicate the UE to monitoring future PDCCH. The predictability may be determined based on the service type: for example, bi-directional speech conversation is likely to have similar characteristics over time. Other kinds of traffic may be more difficult to predict.

In any of the above embodiments and examples, the identification of the mobile device is at least one of: a pseudo-random sequence from a set of orthogonal or quasi-orthogonal sequences, or a Radio Network Temporary Identifier, RNTI. In general, when an UE or terminal identification is mentioned above, any number or label or any king of identifier associated with the UE/terminal is meant. For example, such identifier may be a sequence with which the PoSS signal is scrambled or spread. Such sequence may be any scrambling or spreading sequence out of a set of mutually orthogonal sequences or quasi-orthogonal sequences. Alternatively, or in addition, the identification may be an RNTI assigned to the terminal.

As mentioned above, the present disclosure also provides the corresponding methods, which may be performed by a terminal or a base station and in particular, by a processor, embedded in either of them. Moreover, a non-transitory computer-readable medium may be provided storing code instructions which, when executed on a computer or a processor, perform the steps of the respective methods. Such medium may be any storage such as hard drive, non-volatile memory, SSD, optical or magnetic storages, or the like.

Figure 8:
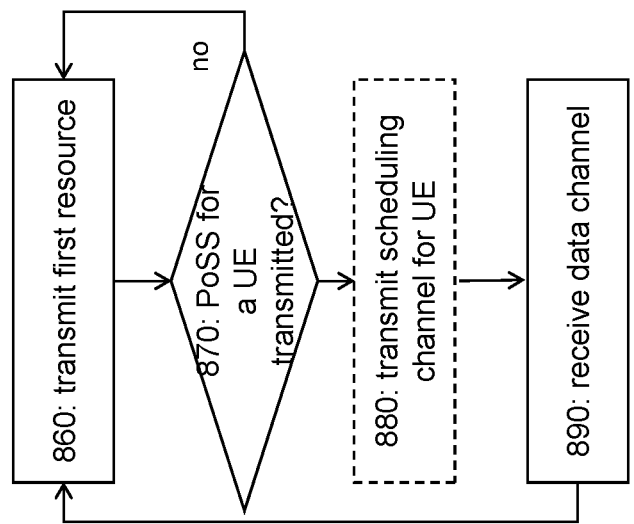
FIG. 8 is a flow diagram illustrating an exemplary method for transmission and reception of a power saving signal and a behavior possibly associated therewith.
Figure 8:
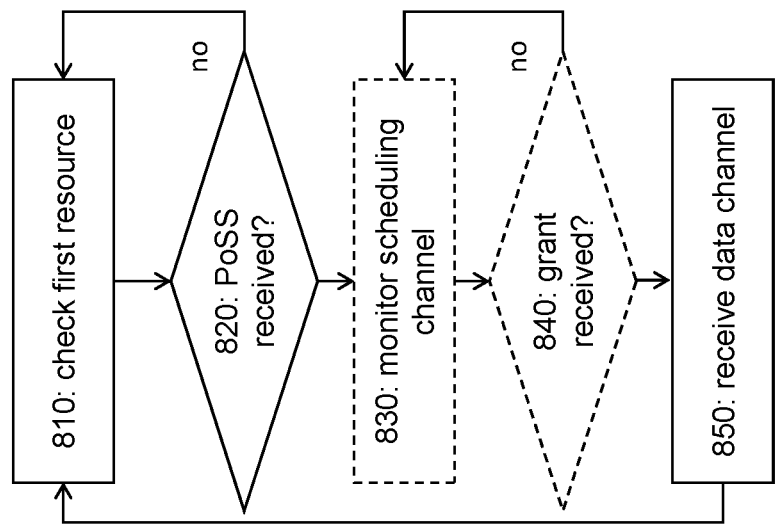

The methods are illustrated in FIG. 8. A method which may be executed by a terminal may comprise: monitoring 810, 820 a signal in a first set of resources; when the monitored signal includes identification of the mobile device and an indicator having a first value (yes in step 820), controlling the transceiver: to receive or transmit 850 signal on a second set of resources and to, after a time period indicated in the monitored control signal, not receive or transmit signal on a second set of resources and monitor the control signal in the first set of resources (arrow back to step 810). As described above, the PoSS detection 820 may be followed by monitoring 830, 840 of a scheduling channel for reception of a grant.

Another method may be executed in a base station. Such method may comprise the steps of: transmitting 860 a signal in a first set of resources, the signal addressed to a terminal (mobile device); and when the monitored signal includes identification of the mobile device and an indicator having a first value (yes in step 870), controlling the transceiver: to receive or transmit signal on a second set of resources (890) and to, after a time period indicated in the transmitted control signal, not receive or transmit signal on a second set of resources and transmit the control signal in the first set of resources. The method may further include step 880 of transmitting scheduling channel (such as PDCCH) with grant to a terminal to transmit or receive data in step 890.

In the following, an exemplary interaction between the network and the terminal is describes, according to an embodiment. The network may be represented by a network node such as a base station (eNB or gNB). However, other network entities may also be employed. The example below is described in the context and applying terminology of the NR. However, this is only for exemplary purposes and the present disclosure is not limited to any particular communication system.

A gNB configures for a UE or a group of UEs parameters related to the power saving and scheduling operation. The configuration may be performed for example according to the settings by the operator, and/or according to the UE capabilities, traffic, load in the cell and or other parts of the network, channel quality, service requirements, cell deployment scenario or the like. The UE receives a configuration of PoSS from gNB. The configuration is performed by RRC signaling such as UE specific RRC signaling or broadcast signaling or default parameters (e.g., specified in standard), which includes one or a combination of the following information elements:

One or more UE ID, or UE ID derived parameter, e.g., RNTI. It is noted that more than one IDs may generally be used to let UE do behavior selection based on which ID is detected. The ID and corresponding UE behavior and parameter setting may be RRC configured, e.g., by UE-specific signaling.

A sequence ID used for the first part of PoSS, which can be derived from a UE ID or related parameter, e.g., RNTI.

The sequence can serve as a reference signal of PoSS. In other words, the PoSS may include two parts—a reference signal part and a control channel part. For example, the PoSS may be formed as a DMRS (demodulation reference signal) and control information or as synchronization signal and control information. The control information may be mapped on a time/frequency resource different from the reference signal, or into the dame time/frequency resource in which case the control information may be indicated by selection of the sequence among a plurality of possible sequences. However, these are only examples and other embodiments are possible. The PoSS may be formed only by the sequence or by a sequence, different from DMRS or SSB or any other sequence used for other purpose in combination with a control information.

Time and frequency domain resource used by a first part and/or a second part of PoSS. Here, the first part of PoSS denotes the reception of the indication upon which the transition from the power saving mode into the active mode is performed. In other words, the first part denoted the portion including PoSS. The second part is the control information which specifies further parameters such as the duration of the active mode, or parameters mentioned below and above.

Time, frequency and/or code domain resource used by the first part. This may be specified by means of a starting slot/symbol and timing with which the terminal has to check whether PoSS is actually transmitted or which value does it have. The UE may be required to monitor the first part of PoSS in certain time, frequency and/or code domain resource. After the UE is able to detect the first part of PoSS in this example, the UE can then go to detect the second part of PoSS including control information or further control information (in case the first part of PoSS also carries some information).

Time, frequency domain resource used for the second part of PoSS, e.g a PDCCH. For example, the RRC configuration may specify the search space configuration for the PDCCH to be monitored after reception of the first part.

It is noted that the frequency domain resource configuration (for any purpose: PoSS or PDCCH or PDSCH or PUSCH, transmitted in the RRC signaling and/or within the first set of resources) may include a bandwidth part indication. The calculation of the actual resource location may be associated with a UE ID or related parameter, e.g., RNTI as mentioned above. The time domain resource configuration may include parameters of periodicity and offset as also mentioned above. Still further, the time domain resource configuration may include time/beam index or PoSS index (for beam-sweeping use cases). In other words, the PoSS may be transmitted with different beam orientations and the sequence of beams. The beam orientation association between the PoSS index (or time index) and further PDCCH/PDSCH/PUSCH is determined by the RRC signaling.

In summary, the UE receives a configuration from the base station, e.g., via RRC signaling, and employs the configuration for monitoring the PoSS and/or PDCCH.

By detecting the PoSS mentioned, the UE determines one or combination of the following behaviors. In other word, PoSS may include or be accompanied by indication of further parameters controlling the UE behavior:

Transitions from power saving mode (also referred to as sleep or OFF mode) to active (also referred to as awake or ON) mode. In particular, the first set of resources may carry indication of timing in which the terminal is to switch from the power saving mode into the active mode. In an example, the switching is dynamically indicated by the PoSS from the base station to the terminal.

Transitions from active (ON) mode to power saving mode (or sleep or OFF mode) within a certain time. In particular, the first set of resources may carry indication of timing in which the terminal is to switch from the active mode into the power saving mode. In an example, the switching is dynamically indicated by the PoSS from the base station to the terminal either in the first set of resources or in the second set of resources.

Triggering transition from RRC_INACTIVE/IDLE mode to RRC_CONNECTED mode. Based on the successful detection of PoSS, the transition from the RRC_INACTIVE/IDLE mode into the RRC_CONNECTED mode may be triggered as described above for the triggering between the power saving mode and the active mode.

Triggering transition from RRC_CONNECTED mode to RRC_INACTIVE/IDLE mode. Following the above triggering from the power saving mode (first mode) to the active mode (second mode), correspondingly, the switching back from the RRC_CONNECTED mode into the RRC_INACTIVE/IDLE mode may be performed as described in the above embodiments for switching from the active mode back into the power saving mode. In particular, this may be performed after a predetermined timing such as timing given by the PoSS signaling, configured by RRC or defined by a standard. Alternatively, the switching may be performed by detecting PoSS signal with a value instructing such switching, or the like.

Determining bandwidth part or numerology (subcarrier spacing) information. This may be indicated in the PoSS (in general, in the first set of resources) either for the reception of the PDCCH and/or the PDSCH or PUSCH.

Determining the time and frequency domain resource used by detection of future physical downlink control channel (PDCCH) by the indication in the PoSS, which could be:

PDCCH time and/or frequency domain resource indication. This could be a new CORESET defined specifically for PoSS.

Time and/or frequency domain candidate resources for PDCCH blind detection, which could be associated with UE ID or configured RNTI. In other words, search space configuration or at least one or more parameters for the search space configuration.

Determining the resource of the scheduled or configured PDSCH of one or multiple slots and turns into power saving mode after decoding the transport blocks, TBs, in the PDSCH resource and transmitting HARQ-ACK, (transport block is defined in LTE and NR as a data unit which is provided from medium access control, MAC, layer to the physical layer for transmission within one transmission time interval, for instance one transmission over PDSCH or PUSCH). In other words, when the PDSCH transmission scheduled by the reception of the PoSS and the corresponding PDSCH resource indication either in PDCCH or directly in the first set of resources terminates, the terminal may transit automatically into the power saving mode again.

Determining the resource of the PUSCH (with or without grant) of one or multiple slots and turns into power saving mode after transmitting the data in the PUSCH resource and receiving no retransmission scheduling in a certain time period. In other words, when the PUSCH transmission scheduled by the reception of the PoSS and the corresponding PUSCH resource indication either in PDCCH or directly in the first set of resources terminates, the terminal may transit automatically into the power saving mode again.

The UE, when detecting in PoSS resources various parameters, determines one or a combination of the behaviors mentioned above based on the detected RNTI type used for the CRC scrambling in the detected PoSS. For example, an RNTI (a first RNTI) may be reserved to indicate that after receiving PoSS, the UE is to listen to a PDCCH whereas another RNTI (a second RNTI) may be reserved to indicate that the UE is to directly receive PDSCH or PUSCH. The first or the second RNTI may be used to scramble or spread the PoSS signal so that both RNTIs are tried in the blind decoding of the PoSS.

Alternatively, or in addition to detection by using RNTI, the UE can determine one or a combination of the behaviors based on the sequence ID or index detected in the PoSS, different from the RNTI. It is noted that the term "behavior" here refers to any of the above mentioned parameters and settings including not only the decision on whether after transition to the active mode PDCCH or directly the data channel is to be received. Rather, the behavior may also include the configuration of the channels (search space of the PDCCH, resources to be received or transmitted, HARQ resources, time after which the terminal is to switch back into the power saving mode when switched into the active mode and the like).

In addition or alternatively, the terminal may determine one or a combination of the behaviors based on the time/frequency/code resource used by the detected PoSS and/or based on the explicit indication in the detected PoSS.

According to an exemplary implementation, the terminal determines the (QCL) quasi-colocation relation or beam index association between the PoSS and future received PDCCH based on the detected PoSS time/frequency/code domain resource or based on the time index (beam index) explicitly indicated in the detected PoSS. This QCL determination may be particularly relevant for the embodiments in which the PoSS detection is followed by monitoring PDCCH for allocation of a data channel. The QCL concept is exploited in NR and may be explained in a simplified manner as follows: If two signals are QCL, it means the UE can assume same reception/transmission parameter in large scale channel parameters, e.g., Doppler shift, Doppler spread, average delay, delay spread, spatial received parameter and beam orientations. This helps to improve the UE channel estimation performance.

Alternatively or in addition, the terminal determines the QCL relation or beam index association between the PoSS and future received PDSCH based on the detected PoSS time/frequency/code domain resource or time index (beam index) explicitly indicated in detected PoSS. This QCL determination may be particularly relevant for the embodiments in which the PoSS detection is followed by directly transmitting or receiving data on PDSCH or PUSCH. In other words, the UE can assume the QCL between the detected PoSS and the future PDCCH/PDSCH/PUSCH.

With regard to PUSCH, the terminal may determine DL-UL beam correspondence relation between the PoSS (in downlink, DL) and future transmitted PUSCH (in uplink, UL) based on the detected PoSS time/frequency/code domain resource or time index (beam index) explicitly indicated in detected PoSS.

Alternatively or in addition, the terminal determines DL-UL beam correspondence relation between the PoSS and future transmitted PUCCH based on the detected PoSS time/frequency/code domain resource or time index (beam index) explicitly indicated in detected PoSS. PUCCH is a physical uplink control channel which may be used, for instance to transmit feedback concerning the data transmission in downlink. PUCCH can carry, for instance, acknowledgements (positive and/or negative) and/or channel quality measurements.

The PoSS signal may be a signal of a known (at the receiver as well as at the transmitter, i.e., at the terminal as well as base station) shape and/or power so that it may be used as a reference signal. For example, in accordance with an embodiment, the terminal conducts radio resource management (RRM) measurement by receiving PoSS configured as described above. The RRM functions include for instance handover, congestion and call admission control. Here, the PoSS may be used, for instance, to determine cells suitable for receiving and/or transmitting signals. In other words, the RRM measurement and report may be based on the receiving of the PoSS in addition to the current measured objects, i.e., SSB and/or CSI-RS As already mentioned above, in the power saving mode, the terminal may start to detect the second part of PoSS (e.g., PDCCH, PUCCH, PDSCH, PUSCH) only after it detects the sequence in the PoSS. The sequence may be any sequence associated with the UE, i.e., a sequence scrambled with a UE ID such as RNTI or the like.

It is noted that after reception of the PoSS, the UE detection of future PDCCH may be performed as a paging (for example when performed in the RRC_IDLE mode: after the PoSS is detected, UE can start monitoring the paging or, alternatively, the PoSS may replace paging), in which CRC (of the PDCCH scheduling or paging message) is scrambled by a special paging RNTI, P-RNTI (may be UE specific or a group specific RNTI). In other words, the PDCCH of paging does not need to be monitored before receiving PoSS by the RRC configuration previously. Rather, paging procedure may follow the PoSS reception.

The RNTI used in the determination of the terminal behavior after reception of the PoSS could be C-RNTI, or CS-RNTI, or MCS-RNTI or SFI-RNTI, or newly defined power-saving-RNTI, which may be configured as described above, e.g., by RRC signaling. By way of non-limiting illustrational examples: If the UE active behavior is controlled in a general UE specific level, C-RNTI can be used. If the UE active behavior reuses the current SPS (semi-permanent scheduling) configuration, CS-RNTI can be used. The SPS configuration ID can be indicated in the PoSS. This can be UE specific or UE group specific. If the UE active behavior is for an URLLC use cases, the MCS-RNTI can be used, which is UE specific. If the UE active behavior control reuse the signaling structure of current Slot Format Indication (SFI), the SFI-RNTI can be used, which is UE group level.

In an exemplary embodiment, once the UE detects PoSS whose CRC of the second part is scrambled by C-RNTI, the UE determines the PDSCH/PUSCH resource assignment based on the indication in the PoSS.

Once the UE detects PoSS whose CRC of the second part is scrambled by a certain new UE group-RNTI or UE-specific RNTI, the UE may determine future control channel resource location based on the indication in the PoSS (e.g., in its second part)

Once the UE detects PoSS whose CRC of the second part is scrambled by an SFI-RNTI, the UE may determine the future slot format (or future resource direction) based on the indication in PoSS.

During the PoSS monitoring, the terminal thus needs to blindly decode only the resources configured for reception of the PoSS (first set of resources). The configuration possibilities are described in several examples above and may include RRC, standard definition and/or dependency on some further parameters.

The detected PoSS time/frequency/code domain resource index or time index (beam index) possibly explicitly indicated in detected PoSS may be used also for other purposes. For example according to one or more of them, the UE may determine an UL power control spatial related parameter. For example, in the current standard, the power control parameter includes the spatial or beam orientation information, which is more like an index to allow different power control parameters setting for different beam orientation. The UE transmission power control can use this information obtained from PoSS. However, the power control may include other parameters alternatively or in addition and there may also be determined by using PoSS.

According to a particular exemplary implementation, once the UE detects PoSS, depending on the detected sequence ID or index or UE ID, the UE may follows one of the below behaviors:

Determines the PDSCH/PUSCH resource assignment based on the indication in PoSS.

Determines future control channel resource location (PDCCH and/or PUCCH) based on the indication in PoSS.

Determines the future slot format (or future resource direction) based on the indication in PoSS.

According to another exemplary and non-limiting implementation, once the UE detects PoSS, depending on the time/frequency/code resource position/index of the PoSS, the UE follows one of the below behaviors:

Determines the PDSCH/PUSCH resource assignment based on time/frequency/code resource of detected PoSS or the contained indication.

Determines future control channel resource location (PDCCH and/or PUCCH) based on time/frequency/code resource of detected PoSS or the contained indication.

Determines the future slot format (or future resource direction) based on time/frequency/code resource of detected PoSS or the contained indication.

In other words, the time/frequency/code resource position/index of the PoSS decide which of the above three possible behaviors are to be applied after detection of the PoSS.

In summary, the PDCCH/PDSCH/PUSCH resource indication by PoSS can use some combination of input parameters, which could be the UE ID, RNTI, resource index of the detected PoSS, and the explicit field in PoSS PDCCH.

Beam/QCL related indication or beam correspondence indication between PoSS and indicated upcoming PDCCH/PDSCH/PUSCH/PUCCH may be assumed, e.g., fixed or configured by signaling such as RRC.

Power control related parameters, especially spatial information for PUSCH/PUCCH/SRS, can be derived from the detected PoSS. In other words, sounding reference signal (SRS) configuration may be selected on the basis of one or more PoSS parameters. A plurality of SRS configurations may be possible or provided in standard or defined by RRC signaling and the PoSS parameters may select among them the SRS configuration applicable.

As described above, the mode switching from the power saving mode into the active mode is triggered by the detection of the PoSS. However, the PoSS may be equally applicable to switch from the active mode to the power saving mode. In particular, the detection of the PoSS (as opposed to not detecting the PoSS in the expected resources, the first set of resources) may trigger mode switching from the first mode into the second mode and vice versa. Alternatively, there may be different values which the PoSS may assume—one for switch from the first mode to the second mode and the other one for switching from the second mode into the first mode.

PoSS detection procedure may include two steps: In the first step, sequence detection is performed to determine if the PoSS is present or which value it has. In the second step, the PDCCH configuration or the PDSCH/PUSCH configuration is detected. It has been exemplified above that both the first part and the second part control information is determined in this order which may be the case when they are both in the first resources. However, the present disclosure is not limited by such configuration and the first set of resources may also be distributed, so that first and second part of PoSS and resources are separated in time and/or frequency and/or code domain.

PoSS can be also used for RRM measurement.

The present disclosure can be realized by software, hardware, or software in cooperation with hardware. Each functional block, such as the circuitries, used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

Summarizing, a mobile device is provided comprising: a transceiver, which, in operation, receives and/or transmits a signal; a circuitry, which, in operation: monitors a signal in a first set of resources, and, when the monitored signal includes identification of the mobile device and an indicator having a first value, controls the transceiver: to receive or transmit signal on a second set of resources and to, after a time period indicated in the monitored control signal, not receive or transmit signal on a second set of resources and monitor the control signal in the first set of resources.

For example, out of said time period, when the monitored control signal includes the indicator having a second value, continue monitoring the control signal in the first set of resources and not receive or transmit signal on a second set of resources.

The first resource set may be located in a fixed distance or a distance configured by radio resource control protocol from resources allocated for a synchronization signal or a reference signal.

Moreover, in an embodiment, the circuitry, in operation, within said time period does not monitor the control signal in the first set of resources.

In an example, the mobile terminal is referred to as being in a first mode out of the time period and as being in a second mode within the time period, and the circuitry, in operation, when the mobile device is in the second mode monitors the control signal in the first set of resources and sets the mobile device into the first mode after a power-saving period when the monitored control signal includes the indicator having the second value.

In particular, the mobile terminal is referred to as being in a first mode out of the time period and as being in a second mode within the time period, and the circuitry, in operation, upon setting the mobile device from the first mode to the second mode: determines resource candidates to be monitored on a physical downlink control channel for receiving scheduling information based on an indication included in the monitored control signal and/or the identification of the mobile device, controls the transceiver to receive signal in the resource candidates, based on the received signal in the resource candidates, determine data resources for downlink or uplink data transmission, and control the transceiver to receive or transmit data on the determined data resources.

According to an embodiment, the mobile terminal is referred to as being in a first mode out of the time period and as being in a second mode within the time period, and the circuitry, in operation, upon setting the mobile device from the first mode to the second mode: determines data resources for downlink or uplink data transmission based on an indication included in the monitored control signal and/or the identification of the mobile device, control the transceiver to receive or transmit data on the determined data resources.

Moreover, in some examples, the circuitry, in operation, determines resources for receiving or transmitting of transmission acknowledgements corresponding to the determined data resources based on the indication included in the monitored control signal and/or the identification of the mobile device.

In particular, the mobile terminal is referred to as being in a first mode out of the time period and as being in a second mode within the time period, and the circuitry, in operation, based on said identification of the mobile device and/or based on traffic selects whether upon setting the mobile device from the first mode to the second mode: resource candidates to be monitored on a physical downlink control channel for receiving scheduling information to schedule data resources for downlink or uplink data transmission are determined according to an indication included in the monitored control signal and/or the identification of the mobile device, or directly the data resources for downlink or uplink data transmission are determined according to an indication included in the monitored control signal and/or the identification of the mobile device.

Moreover, in some exemplary implementations, the identification of the mobile device is at least one of: a pseudorandom sequence from a set of orthogonal or quasi-orthogonal sequences, or a Radio Network Temporary Identifier, RNTI.

In some embodiments, the circuitry, in operation, determines QCL relation or beam index association between the monitored control signal and the data channel in the second set of resources based on time, frequency or code resource of the detected control signal.

For example, the monitoring of the first resource set includes less blind decodings than the monitoring of the second resource set. In this way, monitoring of PoSS may be more power-efficient.

According to another aspect, a network node is provided, comprising: a transceiver, which, in operation, receives and/or transmits a signal; a circuitry, which, in operation: transmits a signal for a mobile device in a first set of resources, when the transmitted signal includes identification of the mobile device and an indicator having a first value, controls the transceiver: to receive or transmit signal on a second set of resources for said mobile device and to, after a time period indicated in the transmitted control signal, not receive or transmit signal on a second set of resources and transmit the control signal in the first set of resources for that mobile device.

For example, out of said time period, when the transmitted control signal includes the indicator having a second value, continue transmitting the control signal in the first set of resources and not receive or transmit signal on a second set of resources (for a particular mobile device).

The first resource set may be located in a fixed distance or a distance configured by radio resource control protocol from resources allocated for a synchronization signal or a reference signal.

Moreover, in an embodiment, the circuitry, in operation, within said time period does not transmit the control signal in the first set of resources for a given mobile device.

In an example, the mobile device is referred to as being in a first mode out of the time period and as being in a second mode within the time period, and the circuitry of the network node, in operation, when the mobile device is in the second mode transmits the control signal in the first set of resources and considers the mobile device in the first mode after a power-saving period when the transmitted control signal includes the indicator having the second value.

In another example, the circuitry, in operation, upon setting the mobile device from the first mode to the second mode: determines resource candidates to be monitored on a physical downlink control channel for receiving scheduling information and include the corresponding indication into the transmitted control signal and/or the identification of the mobile device, controls the transceiver to transmit signal in the resource candidates, based on the transmitted signal in the resource candidates, determine (set) data resources for downlink or uplink data transmission, and control the transceiver to receive or transmit data on the determined data resources.

According to an embodiment, the circuitry, in operation, upon setting the mobile device from the first mode to the second mode: determines (sets) data resources for downlink or uplink data transmission and includes the corresponding indication into the transmitted control signal and/or the identification of the mobile device, controls the transceiver to receive or transmit data on the determined data resources.

Moreover, in some examples, the circuitry, in operation, determines (sets) resources for receiving or transmitting of transmission acknowledgements corresponding to the determined data resources based on the indication included in the transmitted control signal and/or the identification of the mobile device.

In particular, in an example, the circuitry, in operation, based on said identification of the mobile device and/or based on traffic selects whether upon setting the mobile device from the first mode to the second mode: resource candidates to be transmitted for the mobile device on a physical downlink control channel for scheduling information to schedule data resources for downlink or uplink data transmission are determined according to an indication included in the transmitted control signal and/or the identification of the mobile device, or directly the data resources for downlink or uplink data transmission are determined (set) according to an indication included in the transmitted control signal and/or the identification of the mobile device.

Moreover, in some exemplary implementations, the identification of the mobile device is at least one of: a pseudo-random sequence from a set of orthogonal or quasi-orthogonal sequences, or a Radio Network Temporary Identifier, RNTI.

In some embodiments, the circuitry, in operation, (sets) determines QCL relation or beam index association between the monitored control signal and the data channel in the second set of resources based on time, frequency or code resource of the detected control signal.

For example, the monitoring of the first resource set includes less blind decodings than the monitoring of the second resource set. In this way, monitoring of PoSS may be more power-efficient.

The methods corresponding to the steps performed by the above mentioned apparatuses are also provided. For example, a method is provided comprising: monitoring a signal in a first set of resources, and when the monitored signal includes identification of the mobile device and an indicator having a first value, controlling the transceiver: to receive or transmit signal on a second set of resources and to, after a time period indicated in the monitored control signal, not receive or transmit signal on a second set of resources and monitor the control signal in the first set of resources.

Moreover, a method is provided comprising the steps of: transmitting a signal in a first set of resources, when the monitored signal includes identification of a mobile device and an indicator having a first value, controlling the transceiver: to receive or transmit signal on a second set of resources and to, after a time period indicated in the transmitted control signal, not receive or transmit signal on a second set of resources and transmit the control signal in the first set of resources.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A user equipment, comprising:
a transceiver, which, in operation, receives control signals including a first control signal and a second control signal; and a circuitry, which, in operation:
  monitors the first control signal in a first set of resources;
  when the monitored first control signal includes identification of the user equipment and an indicator having a first value, controls the transceiver to receive the second control signal on a second set of resources; and
  when the received second control signal includes bandwidth part information for reception of a Physical Downlink Control Channel (PDCCH) and/or a Physical Downlink Shared Channel (PDSCH), controls the transceiver to receive the PDCCH and/or PDSCH on the indicated bandwidth part.

2. The user equipment according to claim 1, wherein the circuitry, when the monitored first control signal includes the indicator having a second value, continues monitoring the first control signal in the first set of resources and does not receive the second control signal on the second set of resources.

3. The user equipment according to claim 1, wherein the first set of resources is located in a fixed distance or a distance configured by radio resource control protocol from resources allocated for a synchronization signal or a reference signal.

4. The user equipment according to claim 1, wherein the circuitry, within a defined time period does not monitor the first control signal in the first set of resources.

5. The user equipment according to claim 1, wherein
  the user equipment is referred to as being in a first mode out of a defined time period and as being in a second mode within the defined time period, and
  the circuitry, when the user equipment is in the second mode, monitors the first control signal in the first set of resources and, when the monitored first control signal includes the indicator having a second value, sets the user equipment into the first mode after a power-saving period.

6. The user equipment according to claim 1, wherein
  the user equipment is referred to as being in a first mode out of a defined time period and as being in a second mode within the defined time period, and
  the circuitry, upon setting the user equipment from the first mode to the second mode:
    determines resource candidates to be monitored on the PDCCH for receiving scheduling information based on an indication included in the monitored first control signal and/or the identification of the user equipment;
    controls the transceiver to receive the first control signal in the resource candidates;
    based on the received first control signal in the resource candidates, determines data resources for downlink or uplink data transmission; and
    controls the transceiver to receive or transmit data on the determined data resources.

7. The user equipment according to claim 1, wherein
  the user equipment is referred to as being in a first mode out of a defined time period and as being in a second mode within the defined time period, and
  the circuitry, upon setting the user equipment from the first mode to the second mode:
    determines data resources for downlink or uplink data transmission based on an indication included in the monitored first control signal and/or the identification of the user equipment; and
    controls the transceiver to receive or transmit data on the determined data resources.

8. The user equipment according to claim 6, wherein the circuitry, in operation, determines resources for receiving or transmitting of transmission acknowledgements corresponding to the determined data resources based on the indication included in the monitored first control signal and/or the identification of the user equipment.

9. The user equipment according to claim 1, wherein
  the user equipment is referred to as being in a first mode out of a defined time period and as being in a second mode within the defined time period, and
  the circuitry, based on the identification of the user equipment and/or based on traffic selects whether, upon setting the mobile device user equipment from the first mode to the second mode:
    to determine resource candidates to be monitored on the PDCCH for receiving scheduling information to schedule data resources for downlink or uplink data transmission according to an indication included in the monitored first control signal and/or the identification of the user equipment; or
    to directly determine the data resources for downlink or uplink data transmission according to an indication included in the monitored first control signal and/or the identification of the user equipment.

10. The user equipment according to claim 1, wherein the identification of the user equipment is at least one of:
  a pseudo-random sequence from a set of orthogonal or quasi-orthogonal sequences; or
  a Radio Network Temporary Identifier, RNTI.

11. The user equipment according to claim 1, wherein the circuitry, in operation, determines QCL relation or beam index association between the monitored first control signal and a data channel in the second set of resources based on time, frequency or code resource of the monitored first control signal.

12. The user equipment according to claim 1, wherein the monitoring of the first set of resources includes less blind decoding than the monitoring of the second set of resources.

13. A network node, comprising:
  a transceiver, which, in operation, transmits control signals including a first control signal and a second control signal; and
  a circuitry, which, in operation:
    transmits the first control signal addressed to a user equipment in a first set of resources;
    when the transmitted first control signal includes identification of the user equipment and an indicator having a first value, controls the transceiver to transmit the second control signal on a second set of resources; and
    when the transmitted second control signal includes bandwidth part information for transmission of a Physical Downlink Control Channel (PDCCH) and/or a Physical Downlink Shared Channel (PDSCH), controls the transceiver to transmit the PDCCH and/or PDSCH on the indicated bandwidth part.

14. A method implemented by a user equipment, the method comprising:
  monitoring a first control signal in a first set of resources;
  when the monitored first control signal includes identification of the user equipment and an indicator having a first value,
  receiving the second control signal on a second set of resources; and when the received second control signal includes bandwidth part information for reception of a Physical Downlink Control Channel (PDCCH) and/or a Physical Downlink Shared Channel (PDSCH), receiving the PDCCH and/or PDSCH on the indicated bandwidth part.

15. A method implemented by a network node, the method comprising:

transmitting a first control signal addressed to a user equipment in a first set of resources;

when the transmitted first control signal includes identification of the user equipment and an indicator having a first value, transmitting a second control signal on a second set of resources; and when the transmitted second control signal includes bandwidth part information for transmission of a Physical Downlink Control Channel (PDCCH) and/or a Physical Downlink Shared Channel (PDSCH), transmitting the PDCCH and/or PDSCH on the indicated bandwidth part.

\* \* \* \* \*

UNITED STATES PATENT AND TRADEMARK OFFICE
CERTIFICATE OF CORRECTION

PATENT NO. : 11,483,770 B2
APPLICATION NO. : 17/100204
DATED : October 25, 2022
INVENTOR(S) : Hongchao Li et al.

It is certified that error appears in the above-identified patent and that said Letters Patent is hereby corrected as shown below:

In the Claims

In Column 23, Claim 4, Line 28:
"time period does not monitor" should read: -- time period, does not monitor --.

In Column 24, Claim 9, Line 15:
"based on traffic selects whether," should read: -- based on traffic, selects whether, --.

In Column 24, Claim 9, Line 16:
"setting the mobile device user equipment from the first" should read: -- setting the user equipment from the first --.

Signed and Sealed this
Twentieth Day of December, 2022

Katherine Kelly Vidal
*Director of the United States Patent and Trademark Office*